Sept. 8, 1942.  C. J. CONNORS  2,295,385
PRUNING SHEARS
Filed June 25, 1941
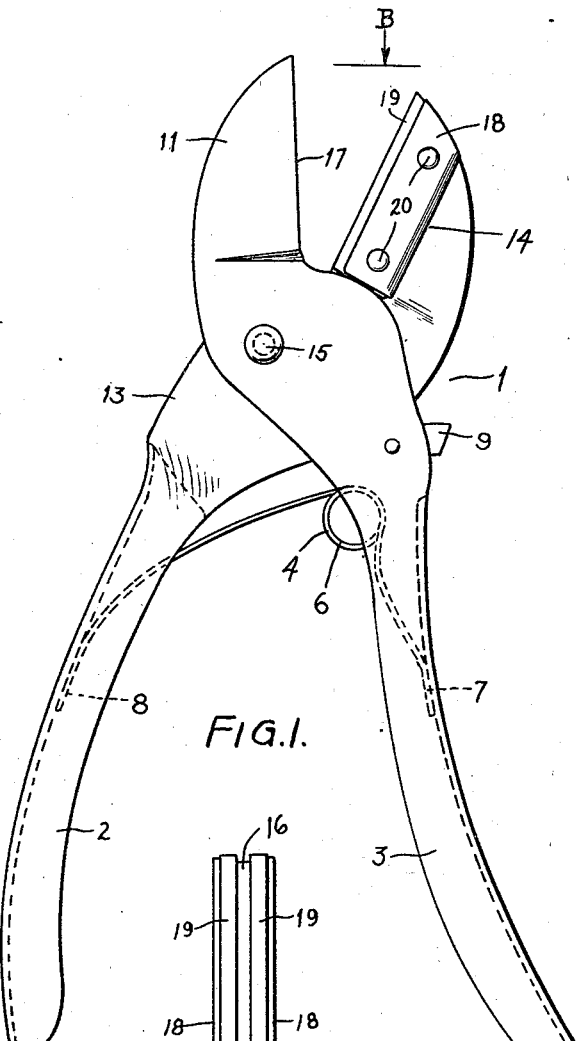
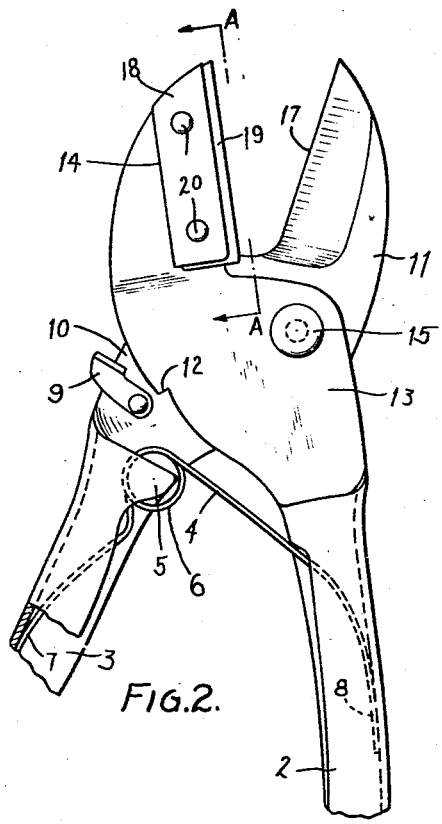
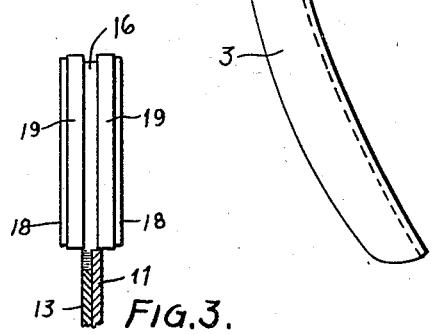
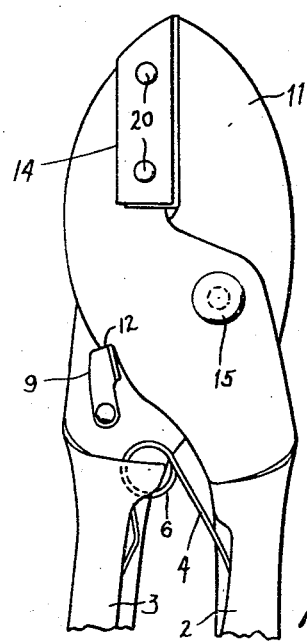
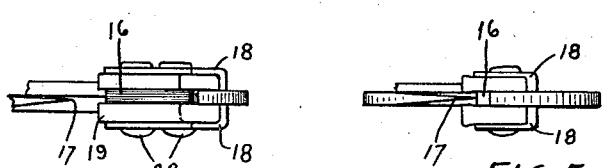
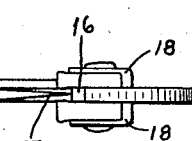
INVENTOR.
Charles J. Connors
BY Frank M. Slough
HIS ATTORNEY.

Patented Sept. 8, 1942

2,295,385

UNITED STATES PATENT OFFICE 2,295,385

PRUNING SHEARS

Charles J. Connors, Cleveland, Ohio, assignor to The American Fork & Hoe Company, Cleveland, Ohio, a corporation of Ohio Application June 25, 1941, Serial No. 399,675

6 Claims. (Cl. 30—262)

My invention relates to shears and relates more particularly to that type of shears known as pruning shears, said shears being adapted for use in pruning trees or hedges, shrubs and the like.

An object of my invention is to provide an improved shear of the type referred to whereby damage to the bark of branches being cut is eliminated.

Another object of my invention is to provide improved pruning shears wherein the cutting ability of the shear is unimpaired by bruises to the bark or the branches being cut.

Another object of my invention is to provide pruning shears of the type referred to which will be economical in manufacture, easily assembled and highly efficient in use.

Other objects of my invention and the invention itself will become more readily apparent by reference to an embodiment of my invention as set forth in the following description and drawing, in which drawing:

Fig. 1 is a top plan view of an embodiment of my invention;

Fig. 2 is a bottom plan view of the shears of Fig. 1;

Fig. 3 is a view taken from the plane A—A of Fig. 2;

Fig. 4 is a view taken from the plane B of Fig. 1;

Fig. 5 is a view similar to that of Fig. 4 but showing the cutting blade of the shear in engagement with the anvil of Figs. 3 and 4; and Fig. 6 is a top plan view of the shears of Fig. 1 showing the shears in closed and latched position.

Referring now to the drawing in which like parts are designated by like reference characters, at 1, I show a shears generally of the "anvil-type" comprising a pair of movable handles 2 and 3, the handles being preferably U-shaped in cross section. In order to normally hold the handles in open position, a spring 4 is provided, said spring being retained to the handle 3 by means of a lug 5 on the handle 3, said lug being disposed adjacent the upper end of the handle and bent downwardly into secure engagement with a coil 6 of the spring 4, free ends 7 and 8 of the spring 4 being shaped into tight engagement with the inner walls of the U-shaped handles 2 and 3.

To hold the handles in closed relation, latch means 9 are pivotally secured to the tang portion 10 of a cutting blade 11 integrally united with the handle portion 3, said latch means being adapted to have locking contact with a struck-out portion 12 provided on the tang 13 of the anvil member 14.

It is to be noted that the shear proper composes as one element one handle and its associated cutting blade element and as another element the other handle and an anvil element, each element being formed from flat one-piece metal stampings, their generally U-shaped handles being formed by bending longitudinally a substantial portion of the handle ends upon the remaining portions thereof. The cooperating blade and anvil elements are then pivotally secured together as at 15 and are restrained in their movement outwardly by the spring means 4 and locked, as shown in Fig. 6, in closed engagement by the latch means 9.

The anvil member 14, as best shown in Figs. 4 and 5 and which forms the upper extension of the handle portion 2, is provided with a copper or like metallic insert member 16 which is integrally secured to the remainder of the blade and which forms a biting surface for the cutting edge 17 of the blade 11. A pair of generally L-shaped anchor blocks 18—18 having resilient means 19, preferably made of a soft rubber or like resilient material seated within said L-shaped members and overlapping the longitudinal upper edge thereof, as best shown in Figs. 3, 4 and 5, are associated with the tang 13 and the insert member 16, said L-shaped members together with the resilient means being secured to the blade 14 by a pair of rivets 20, as shown. Hence, the biting surface afforded by the metallic insert 16 is enclosed by resilient material but the cutting edge of the blade 11 does not contact the said resilient material.

In operation, when a branch is severed by means of the closure of the handles and consequent cutting action of the blade 11, upon a branch enclosed within said blade and anvil members, the rubber anvils protect the bark of the branches being cut, the cutting ability of this pruning shear being maintained while at the same time the bark of the branches being cut are cushioned against bruises, the bark being contacted by the rubber inserts.

It is to be understood that the shear described herein could be variously constructed and that the same, if of the "anvil type" could be provided with the improved resilient inserts of my invention and although I have described my invention in connection with a specific embodiment thereof, I am aware that numerous and extensive departures may be made therefrom without departing from the spirit of my invention and the scope of the appended claims.

I claim:

1. In a pruning shears, a pair of pivotally connected interfitting shear members, one of said shear members being provided with a cutting edge, the other of said shear members being provided with an anvil plate, resilient means laterally disposed of said anvil plate and projecting forwardly thereof, said resilient means being secured to said anvil plate, the forwardly projecting portions of said resilient means forming work engaging shoulders.

2. In a pruning shear, a pair of cooperating pivotally connected shear members, one of said members having a cutting blade disposed adjacent its upper portion and a substantially U-shaped handle portion integrally united therewith, said other shear member comprising a substantially U-shaped handle portion and having integrally secured thereto at its upper portion an anvil plate, a pair of substantially L-shaped members secured on either side of said anchor plate, resilient means being retained therein and projecting forwardly thereof whereby when the handles of said cooperating shear members are drawn together the cutting blade contacts said anvil plate and work is engaged by said resilient means and cutting blade.

3. A tool of the class described, a pair of cooperating members, each of said members being provided with a handle portion, the one member having an upper cutting blade portion and the other member being provided with an upper anvil portion in alinement therewith, said members being pivotally secured together, latch means being provided on one member intermediate the handle and cutting blade portion thereof adapted to have locking engagement with stop means provided intermediate the handle and anvil portions of said other member when the handles are drawn together or when these are withdrawn from each other, spring means tending to urge the members apart, said spring means having their ends projected within the handle portions and an extension of one of said handle portions retaining the same in position.

4. In a shears of the class described, a pair of pivotally connected cooperating shear members, one of said members being provided with a cutting edge, the other of said members being provided with an anvil, resilient means secured to said other member and surrounding said anvil, the cutting edge of said other member being adapted to seat upon said anvil.

5. In a pruning shear, a pair of pivotally connected interfitting shear members, one of said shear members being provided with a cutting edge, the other of said shear members being provided with an anvil, resilient means laterally disposed of said anvil and secured thereto, said cutting edge being adapted to engage said anvil and to be surrounded by said resilient means.

6. In a pruning shear, a pair of cooperating pivotally connected shear members, one of said shear members being provided with a cutting edge, the other of said shear members being provided with an anvil, resilient means being retained therein and projecting outwardly therefrom whereby when the cutting blade contacts said anvil the work is held by said resilient means.

CHARLES J. CONNORS.